United States Patent
Tsai et al.

(10) Patent No.: US 7,835,593 B2
(45) Date of Patent: Nov. 16, 2010

(54) APPARATUS AND METHOD OF VIDEO TRANSFORMATION IN VIDEO ENCODER

(75) Inventors: Yu-Seng Tsai, Sanchung (TW);
Wei-Min Chao, Chungli (TW)

(73) Assignee: Quanta Computer Inc., Tao Yuan Shien (TW)

(*) Notice: Subject to any disclaimer, the term of this patent is extended or adjusted under 35 U.S.C. 154(b) by 1116 days.

(21) Appl. No.: 11/442,050

(22) Filed: May 26, 2006

(65) Prior Publication Data
US 2007/0091182 A1    Apr. 26, 2007

(30) Foreign Application Priority Data
Oct. 21, 2005    (TW) ............................ 94136800 A

(51) Int. Cl.
*G06K 9/32* (2006.01)
(52) U.S. Cl. .................................................. 382/296
(58) Field of Classification Search ................ 382/289; 82/296
See application file for complete search history.

(56) References Cited

U.S. PATENT DOCUMENTS

2003/0133500 A1* 7/2003 Auwera et al. ......... 375/240.11
2004/0013319 A1* 1/2004 Wenstrand et al. .......... 382/299

* cited by examiner

*Primary Examiner*—Bhavesh M Mehta
*Assistant Examiner*—Hadi Akhavannik
(74) *Attorney, Agent, or Firm*—Thomas, Kayden, Horstemeyer & Risley

(57) ABSTRACT

An adjusting apparatus for adjusting a sensed image from a first angle to a second angle is provided. The adjusting apparatus includes a first memory module, a first calculating module, an encoding module, and an output module. The first memory module is used for receiving and storing the sensed image. The first calculating module accesses the sensed image stored in the first memory module according to a predetermined rule, generates an accessed image, and generates an operation signal according to the accessed image. The predetermined rule is a first reading sequence corresponding to the second angle. The encoding module receives and encodes the operation signal to produce a bit-stream. The output module encodes the bit-stream to produce an output image.

8 Claims, 8 Drawing Sheets

FIG.1 (Prior Arts)

APPARATUS AND METHOD OF VIDEO TRANSFORMATION IN VIDEO ENCODER

BACKGROUND OF THE INVENTION

1. Field of the Invention

This invention relates to a video adjusting apparatus. More specifically, this invention is relative to an adjusting apparatus for adjusting the angle of an image.

2. Description of the Prior Art

In recent years, electronic technologies progress with each passing day, so the performance of computers and peripherals improves rapidly. Variety of software advances constantly and becomes cheaper as well. For the above reasons, electronic products are more and more popularized in our daily lives. Many manufacturers of video products are developing new products. To attract more consumers, lots of manufacturers provide relative software when selling digital cameras. With the software, users can watch and edit digital images on computers after taking photos.

Please refer to FIG. 1, which illustrates a scene and two images relative to the scene. The two images are taken by a digital camera disposed with different angles. In prior arts, the direction, in which a digital image is stored, is relative to the angle of disposing the digital camera when the image was taken. If a user holds the camera horizontally when taking the scene 10, the taken image is stored in the camera as the image 12. If the camera is held vertically, the taken image is stored in the camera as the image 14. When the images are transferred to and watched on a computer/TV, the angle of an image may be the same as the image 12 or 14. The inconsistent angles of images often bother many users. Editing images with different angles is inconvenient and inefficient.

As mentioned in the U.S. Pat. No. 6,148,149, a method for rotating digital images in digital cameras is detecting the angle of a scene by a detector before photos are taken. The detected angle is used for adjusting the taken images. The adjusted images are then stored in a memory. The U.S. Pat. No. 6,222,584 also provides a method for adjusting the angle of an image when photos are taken. This method detects the angle of the digital camera by a detector when photos are taken. The detected angle is also used for adjusting the taken images.

The two prior arts above both rotate the taken images just after the images are taken by digital cameras instead of rotating the taken images when the images are encoded later. Because the prior arts need angle detectors, the cost is higher. Besides, the process of detecting angles not only is complicated but also takes much time.

To overcome the aforementioned problems, the main purpose of this invention is to provide an image adjusting apparatus that can adjust the angle of a sensed image based on different accessing sequences.

SUMMARY OF THE INVENTION

One main purpose of this invention is to provide an adjusting apparatus that can adjust the angle of a sensed image based on an accessing sequence corresponding to a specific angle.

The first preferred embodiment according to this invention is an adjusting apparatus for adjusting a sensed image from a first angle to a second angle. This adjusting apparatus includes a first memory module, a first calculating module, an encoding module, and an output module. The first memory module is used for receiving and storing the sensed image. The first calculating module is coupled to the first memory module. According to a predetermined rule, the first calculating module accesses the sensed image from the first memory module to generate an accessed image. The predetermined rule is a first accessing sequence corresponding to the second angle. Based on the accessed image, the first calculating module further generates an operation signal. The encoding module is coupled to the first calculating module. After receiving the operation signal from the first calculating module, the encoding module encodes the operation signal to generate a bit-stream. The output module is coupled to the encoding module. The output module receives the bit-stream from the encoding module and decodes the bit-stream to generate an output image.

The second preferred embodiment according to this invention is also an adjusting apparatus for adjusting a sensed image from a first angle to a second angle. This adjusting apparatus includes a first memory module, a first processing module, a first calculating module, an encoding module, and an output module. The first memory module is used for receiving and storing the sensed image. The first processing module is coupled to the first memory module. According to a predetermined rule, the first processing module accesses the sensed image from the first memory module to generate an accessed image. The predetermined rule is a first accessing sequence corresponding to the second angle. Based on a reference image, the first processing module further adjusts the accessed image to generate a compensated image. The first calculating module is coupled to the first processing module. After receiving the compensated image, the first calculating module performs a calculation to generate an operation signal. The encoding module is coupled to the first calculating module. The encoding module receives the operation signal from the first calculating module and encodes the operation signal to generate a bit-stream. The output module is coupled to the encoding module. The output module receives the bit-stream from the encoding module and decodes the bit-stream to generate an output image.

By accessing the sensed image according to a specific accessing sequence that is corresponding to the second angle, the sensed image can be adjusted from a first angle to the second angle. The second angle can be various. In this way, many complicated circuits, such as angle detectors, can be reduced. Because the operation method of this invention is simple, the operation time can be shorter and the cost can be lower than prior arts.

The advantage and spirit of the invention may be understood by the following recitations together with the appended drawings.

BRIEF DESCRIPTION OF THE APPENDED DRAWINGS

DETAILED DESCRIPTION OF THE INVENTION

This invention provides an adjusting apparatus and an adjusting method. The apparatus and method according to this invention can adjust a sensed image from a first angle to a second angle according to an accessing sequence corresponding to the second angle.

Figure 1:
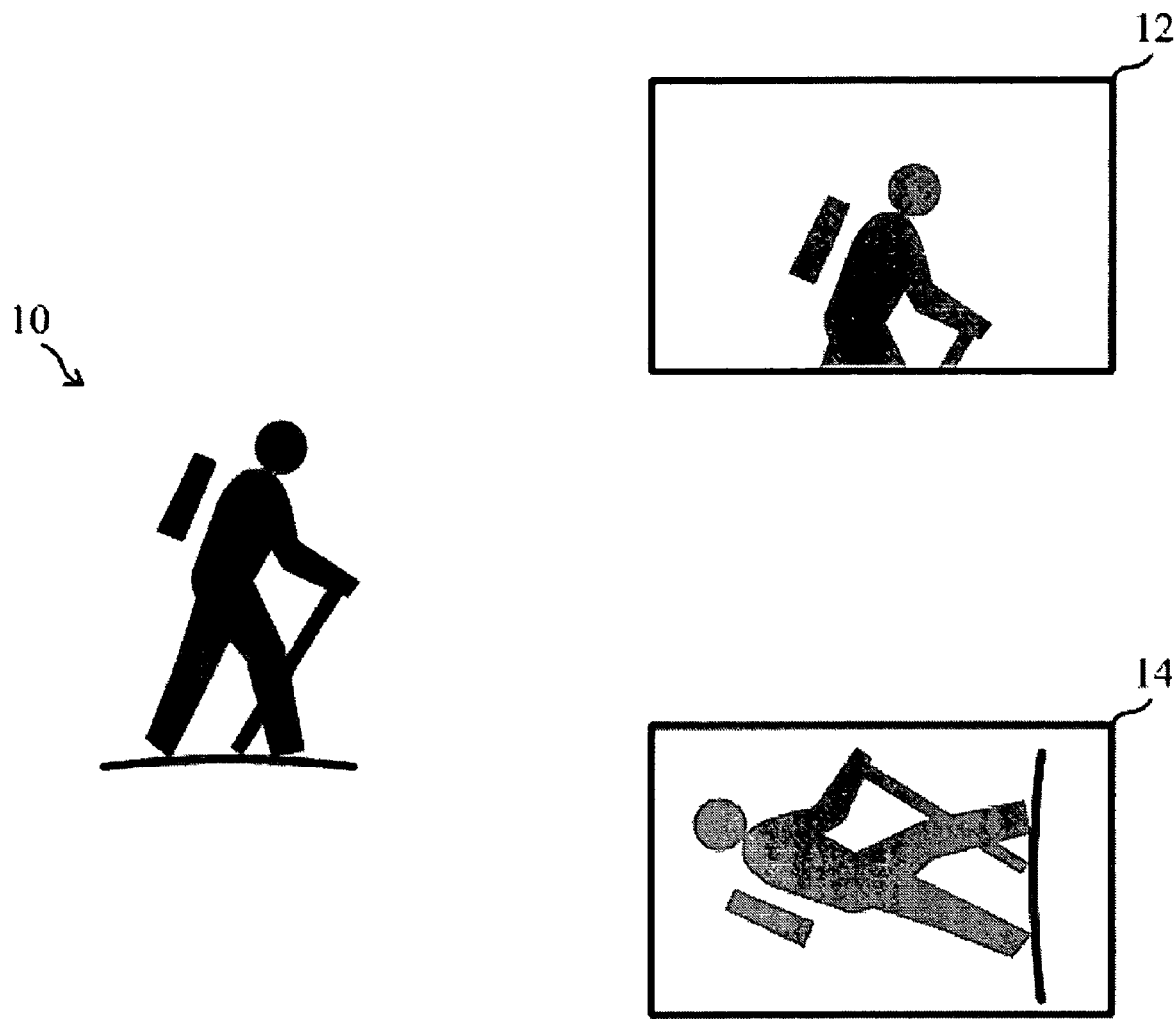
FIG. 1 illustrates a scene and two images relative to the scene.
Figure 2:
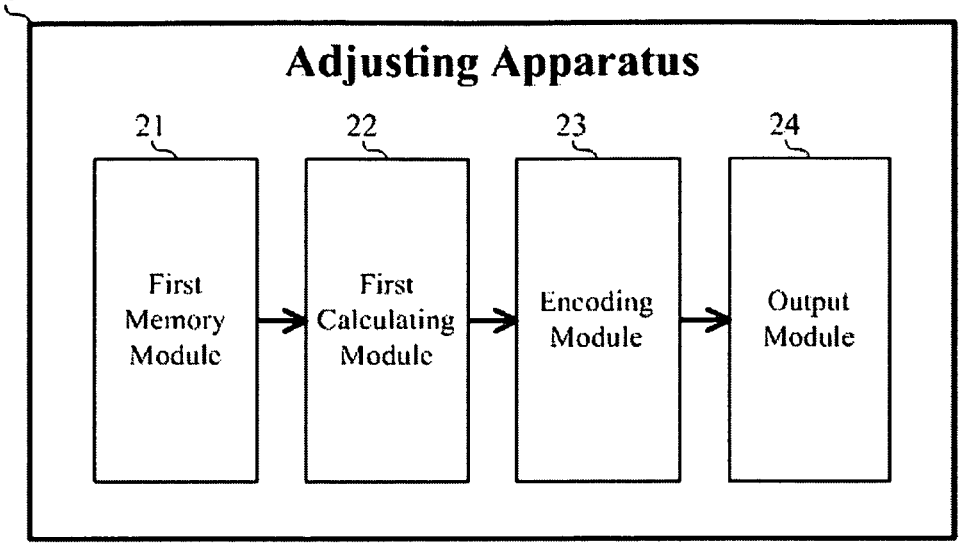
FIG. 2 illustrates the block diagram of the first preferred embodiment according to this invention.
Figure 2:
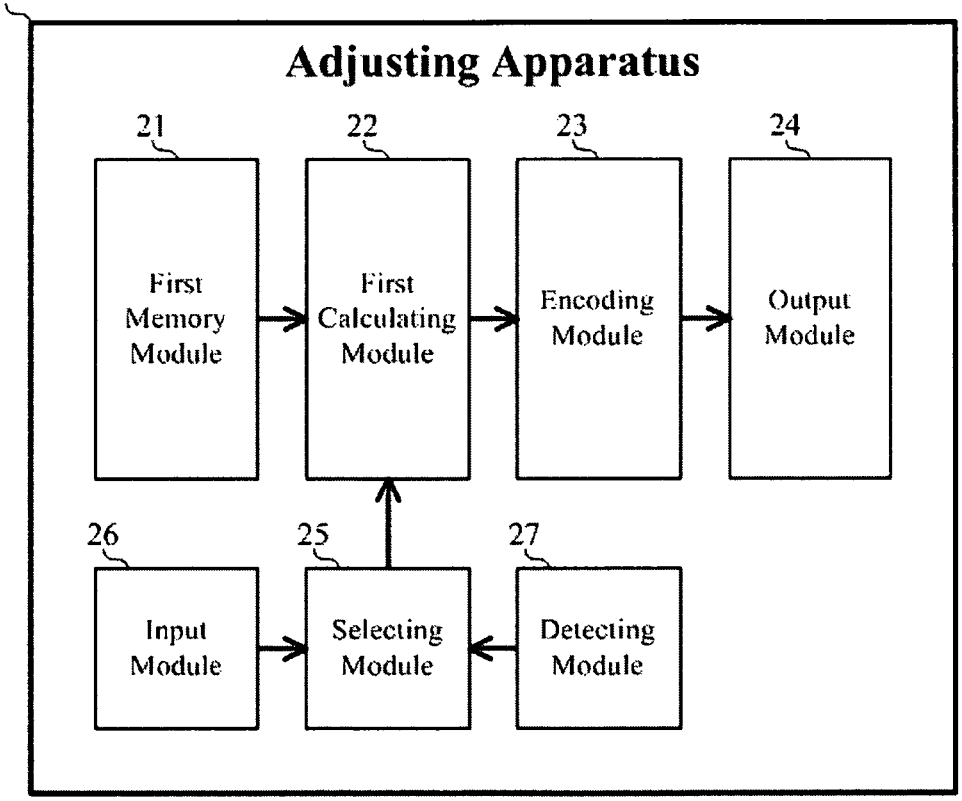

Please refer to FIG. 2(A), which illustrates the block diagram of the first preferred embodiment according to this invention. The adjusting apparatus 20 includes a first memory module 21, a first calculating module 22, an encoding module 23, and an output module 24. The first memory module 21 receives and stores the sensed image. The first calculating module 22 is coupled to the first memory module 21. According to a predetermined rule, the first calculating module 22 accesses the sensed image to generate an accessed image. The predetermined rule is a first accessing sequence corresponding to the second angle. Based on the accessed image, the first calculating module 22 further generates an operation signal.

In actual applications, the first calculating module 22 includes an accessing unit, a discrete cosine transferring (DCT) unit, and a quantizing unit. The accessing unit is coupled to the first memory module 21 and accesses the sensed image to generate the accessed image according to the first accessing sequence. The DCT unit is coupled to the accessing unit. The DCT unit receives the accessed image and performs a DCT calculation to generate a converting signal. The quantizing unit is coupled to the DCT unit. The quantizing unit receives the converting signal and performs a quantization calculation to generate the operation signal.

As shown in FIG. 2(B), the adjusting apparatus 20 can further include a selecting module 25 coupled to the first calculating module 22. A plurality of angles and a plurality of accessing sequences corresponding to the plural angles are previously stored in the selecting module 25. From the plurality of accessing sequences, the selecting module 25 selects the first accessing sequence corresponding to the second angle.

In actual applications, the adjusting apparatus 20 can further include an input module 26 as shown in FIG. 2(B). The input module 26 is coupled to the selecting module 25 and used for inputting the second angle. Besides, the adjusting apparatus 20 can also include a detecting module 27 coupled to the selecting module 25. The detecting module 27 is used for detecting the second angle and providing the second angle to the selecting module 25.

The encoding module 23 is coupled to the first calculating module 22. The encoding module 23 receives the operation signal from the first calculating module 22 and encodes the operation signal to generate a bit-stream. The output module 24 is coupled to the encoding module 23 and used for decoding the bit-stream to generate an output image.

Figure 3:
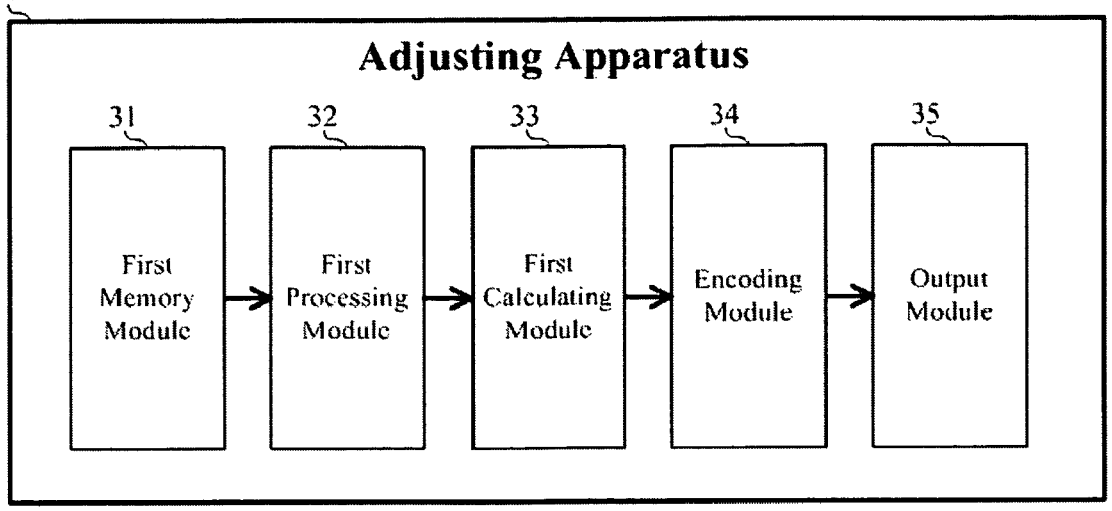
FIG. 3 illustrates the block diagram of the second preferred embodiment according to this invention.
Figure 3:
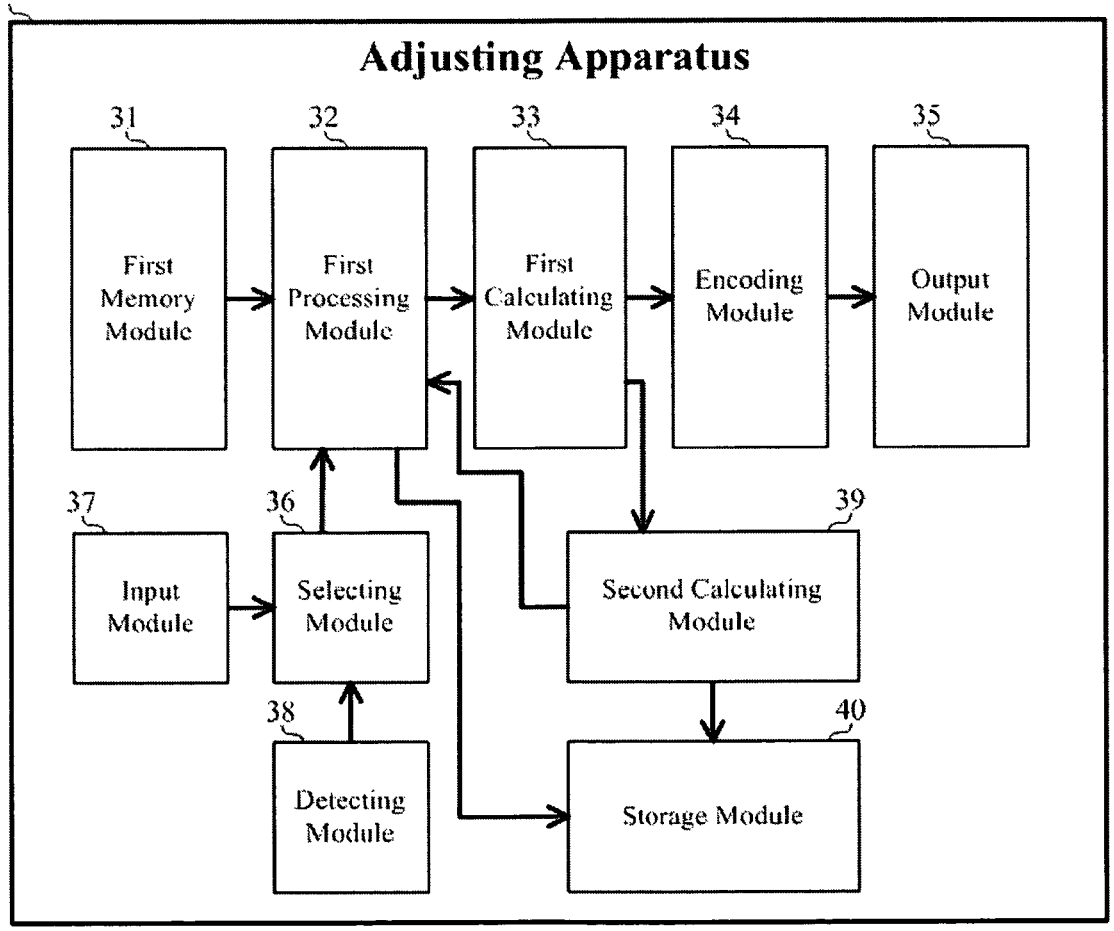

Please refer to FIG. 3(A), which illustrates the block diagram of the second preferred embodiment according to this invention. The adjusting apparatus 30 includes a first memory module 31, a first processing module 32, a first calculating module 33, an encoding module 34, and an output module 35.

The first memory module 31 is used for receiving and storing the sensed image. The first processing module 32 is coupled to the first memory module 31. According to a predetermined rule, the first processing module 32 accesses the sensed image from the first memory module 31 to generate an accessed image. The predetermined rule is a first accessing sequence corresponding to the second angle. Based on a reference image, the first processing module 32 further adjusts the accessed image to generate a compensated image.

In actual applications, the first processing module 32 can include an accessing unit, a calculating unit, a compensating unit, and a first deciding unit. The accessing unit is coupled to the first memory module 31. According to the first accessing sequence, the accessing unit accesses the sensed image to generate the accessed image. The calculating unit is coupled to the accessing unit. Based on the reference image, the calculating unit calculates a total shifting vector between the accessed image and the reference image. The compensating unit is coupled to the calculating unit. Based on the total shifting vector, the compensating unit decides a reference block in the reference image. The first deciding unit coupled to the compensating unit and the first memory module 31. Based on the reference block, the first deciding unit processes the accessed image to generate the compensated image.

In actual applications, the adjusting apparatus 30 can further include a selecting module 36 coupled to the first processing module 32. A plurality of angles and a plurality of accessing sequences corresponding to the plural angles are previously stored in the selecting module 36. From the plurality of accessing sequences, the selecting module 36 selects the first accessing sequence corresponding to the second angle.

The first calculating module 33 is coupled to the first processing module 32. After receiving the compensated image, the first calculating module 33 performs a calculation to generate an operation signal. In actual applications, the first calculating module 33 can include a discrete cosine transferring (DCT) unit and a quantizing unit. The DCT unit is used for receiving the compensated image and performing a DCT calculation to generate a converting signal. The quantizing unit then receives the converting signal and performs a quantization calculation to generate the operation signal.

The encoding module 34 is coupled to the first calculating module 33. The encoding module 34 receives the operation signal from the first calculating module 33 and encodes the operation signal to generate a bit-stream. The output module 35 is coupled to the encoding module 34. The output module 35 receives the bit-stream from the encoding module 34 and decodes the bit-stream to generate an output image.

In actual applications, the adjusting apparatus 30 can further include a second calculating module 39 as shown in FIG. 3(B). The second calculating module 39 is respectively coupled to the first processing module 32 and the first calculating module 33. The second calculating module 39 includes an inverse quantizing unit, an inverse discrete cosine transferring (IDCT) unit, and a second deciding unit. The inverse quantizing unit receives the operation signal and performs an inverse quantizing calculation to generate an inverse quantizing signal. The IDCT unit receives the inverse quantizing signal from the inverse quantizing unit and performs an IDCT calculation to generate a converted image. The second deciding unit is coupled to the IDCT unit and the compensating unit. Based on the reference block, the second deciding unit processes the converted image to generate the reference image.

In actual applications, the adjusting apparatus 30 can also include a storage module 40 coupled to the first processing module 32 and the second calculating module 39. The storage module 40 is used for storing the reference image.

In actual applications, the adjusting apparatus 30 further include an input module 37 coupled to the selecting module 36. The input module 37 is used for inputting the second angle. As shown in FIG. 3(B), the adjusting apparatus 30 can also include a detecting module 38 coupled to the selecting module 36. The detecting module 38 is used for detecting the second angle and providing the second angle to the selecting module 36.

Figure 4:
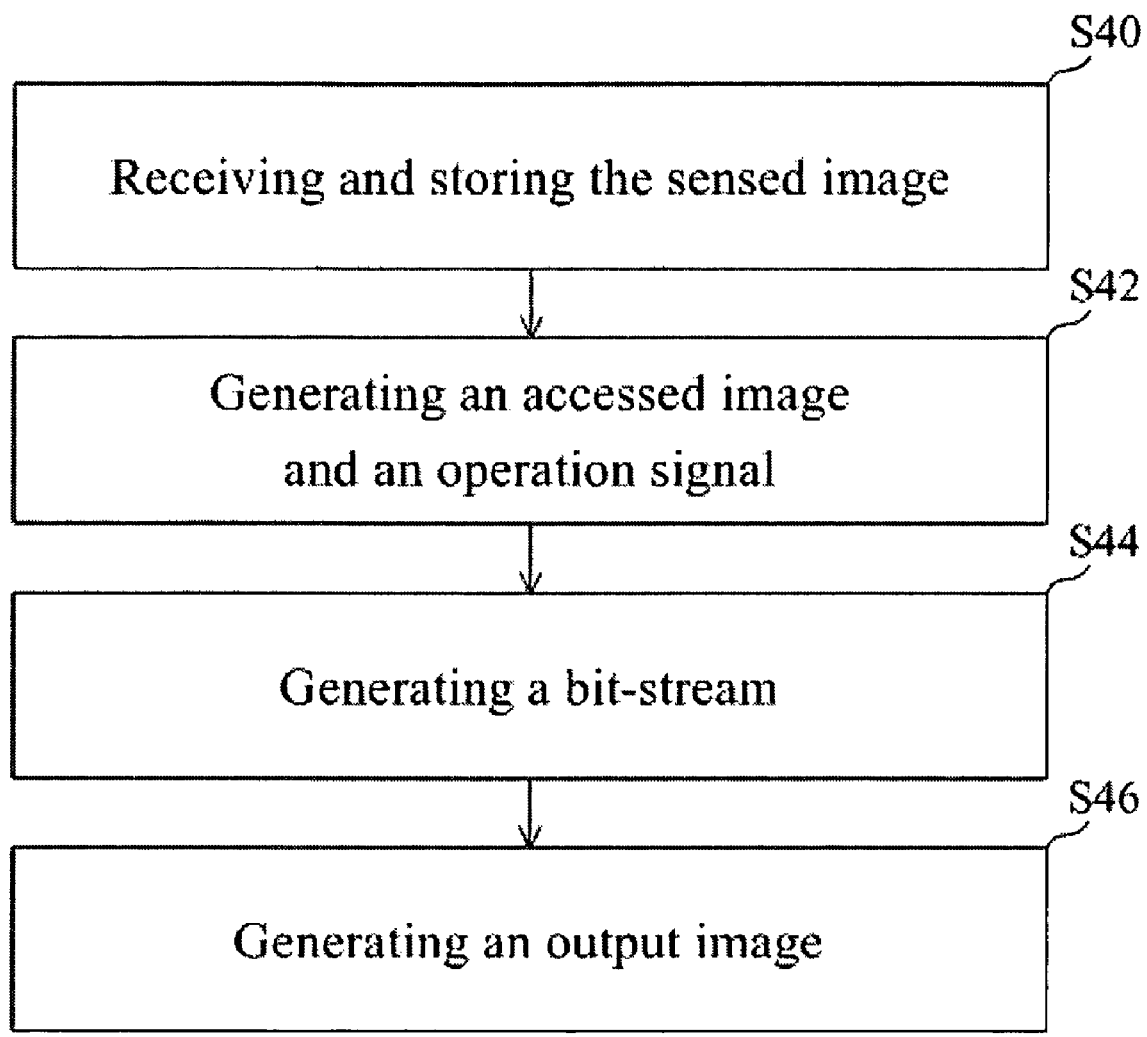
FIG. 4 illustrates the flowchart of the third preferred embodiment according to this invention.

Please refer to FIG. 4, which illustrates the flowchart of the third preferred embodiment according to this invention. The adjusting method includes steps S40 through S46. Step S40 is receiving and storing the sensed image. Step S42 is accessing the sensed image to generate an accessed image according to a predetermined rule and generating an operation signal based on the accessed image. The predetermined rule is a first accessing sequence corresponding to the second angle. Step S44 is encoding the operation signal to generate a bit-stream. Step S46 is receiving the bit-stream and decoding the bit-stream to generate an output image.

Figure 5:
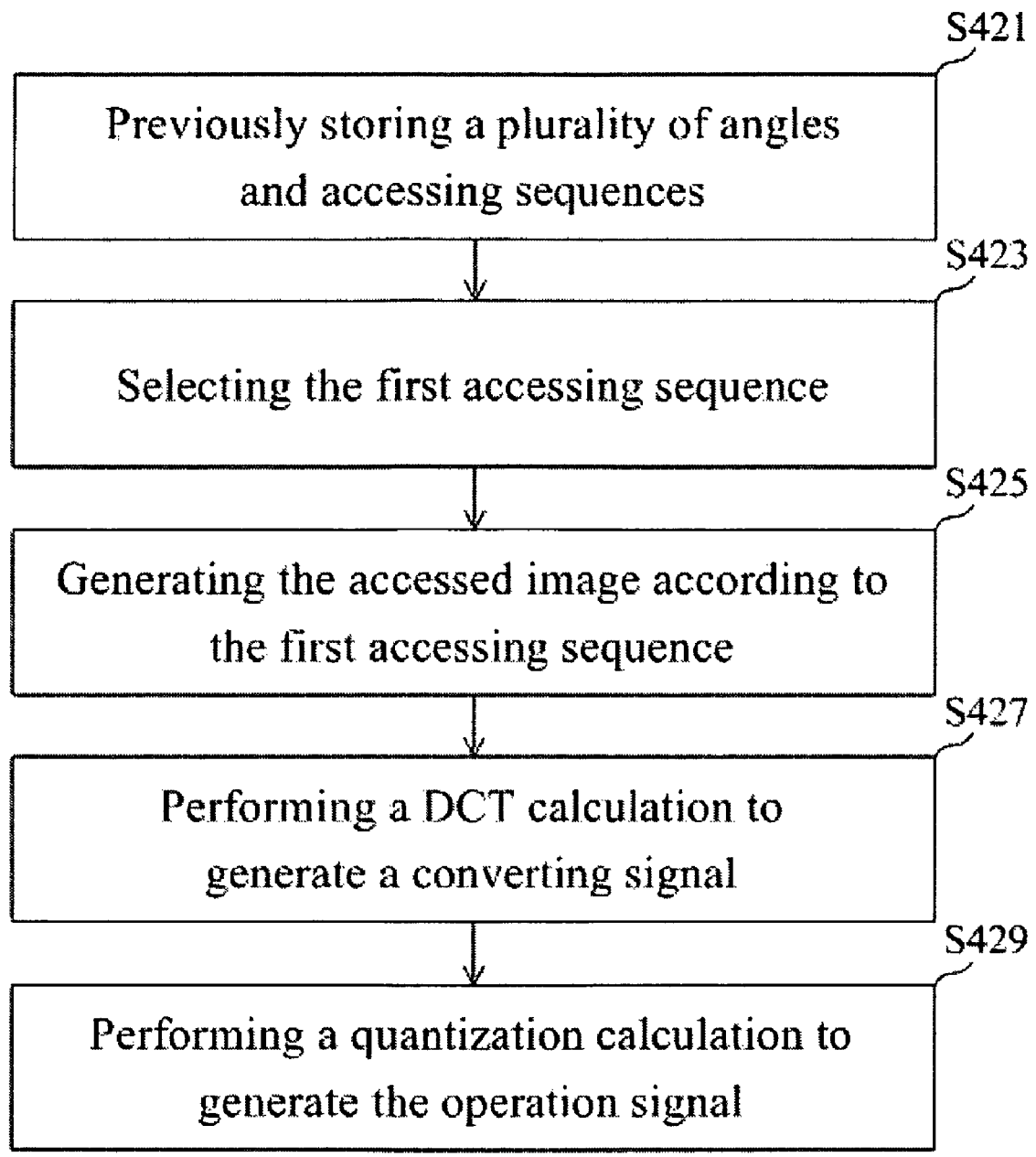
FIG. 5 illustrates the sub-steps can be included in step S42 of FIG. 4.

Please refer to FIG. 5, which illustrates the sub-steps can be included in step S42 of FIG. 4. Step S421 is previously storing a plurality of angles and a plurality of accessing sequences corresponding to the plural angles. Step S423 is selecting the first accessing sequence corresponding to the second angle from the plurality of accessing sequences. Step S425 is accessing the sensed image to generate the accessed image according to the first accessing sequence. Step S427 is receiving the accessed image and performing a DCT calculation to generate a converting signal. Step S429 is receiving the converting signal and performing a quantization calculation to generate the operation signal.

Figure 6:
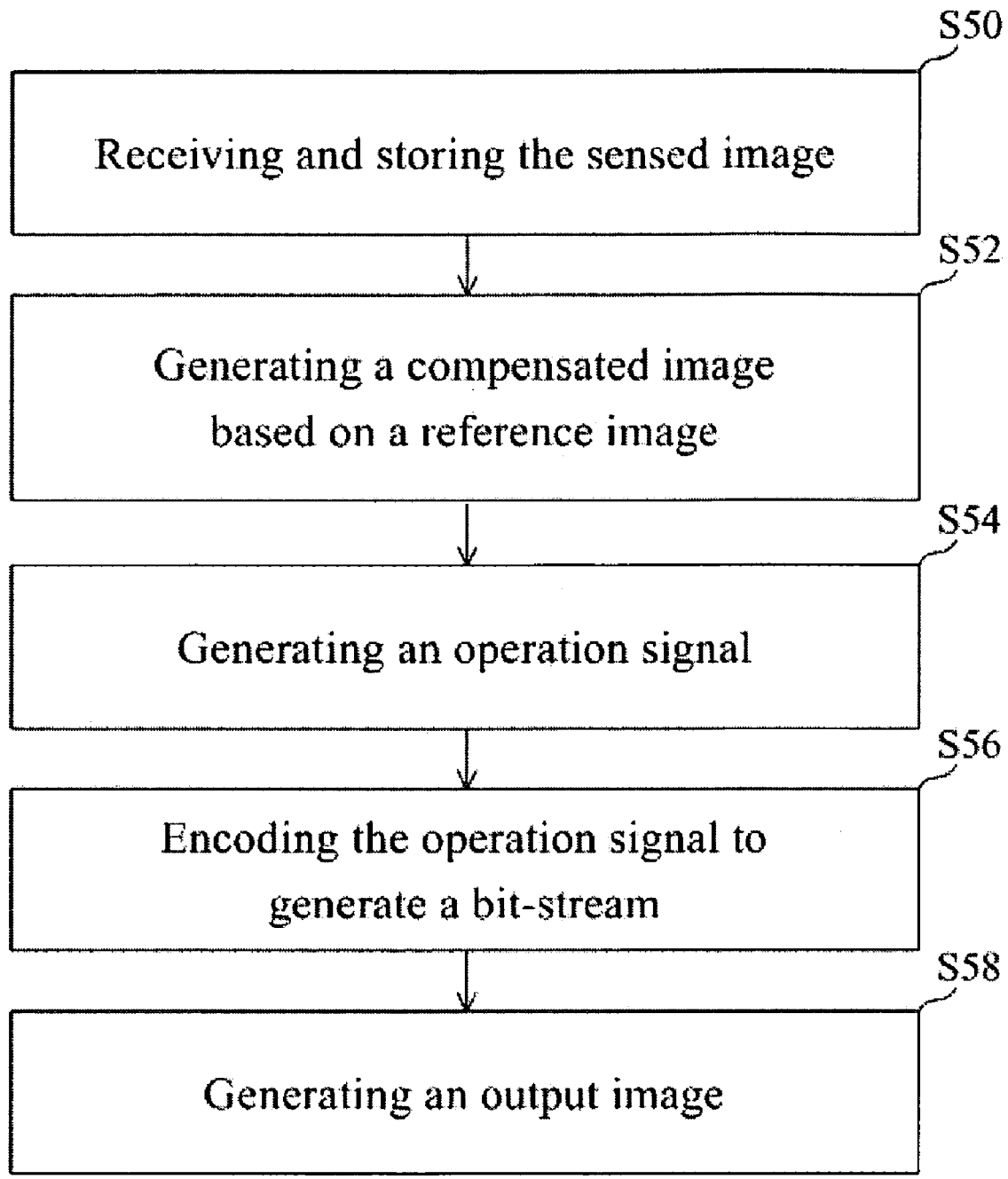
FIG. 6 illustrates the flowchart of the fourth preferred embodiment according to this invention.

Please refer to FIG. 6, which illustrates the flowchart of the fourth preferred embodiment according to this invention. The adjusting method includes steps S50 through S58. Step S50 is receiving and storing the sensed image. Step S52 is accessing the sensed image to generate an accessed image according to a predetermined rule and adjusting the accessed image to generate a compensated image based on a reference image. The predetermined rule is a first accessing sequence corresponding to the second angle. Step S54 is receiving the compensated image and performing a calculation to generate an operation signal. Step S56 is receiving and encoding the operation signal to generate a bit-stream. Step S58 is receiving the bit-stream and decoding the bit-stream to generate an output image.

Figure 7:
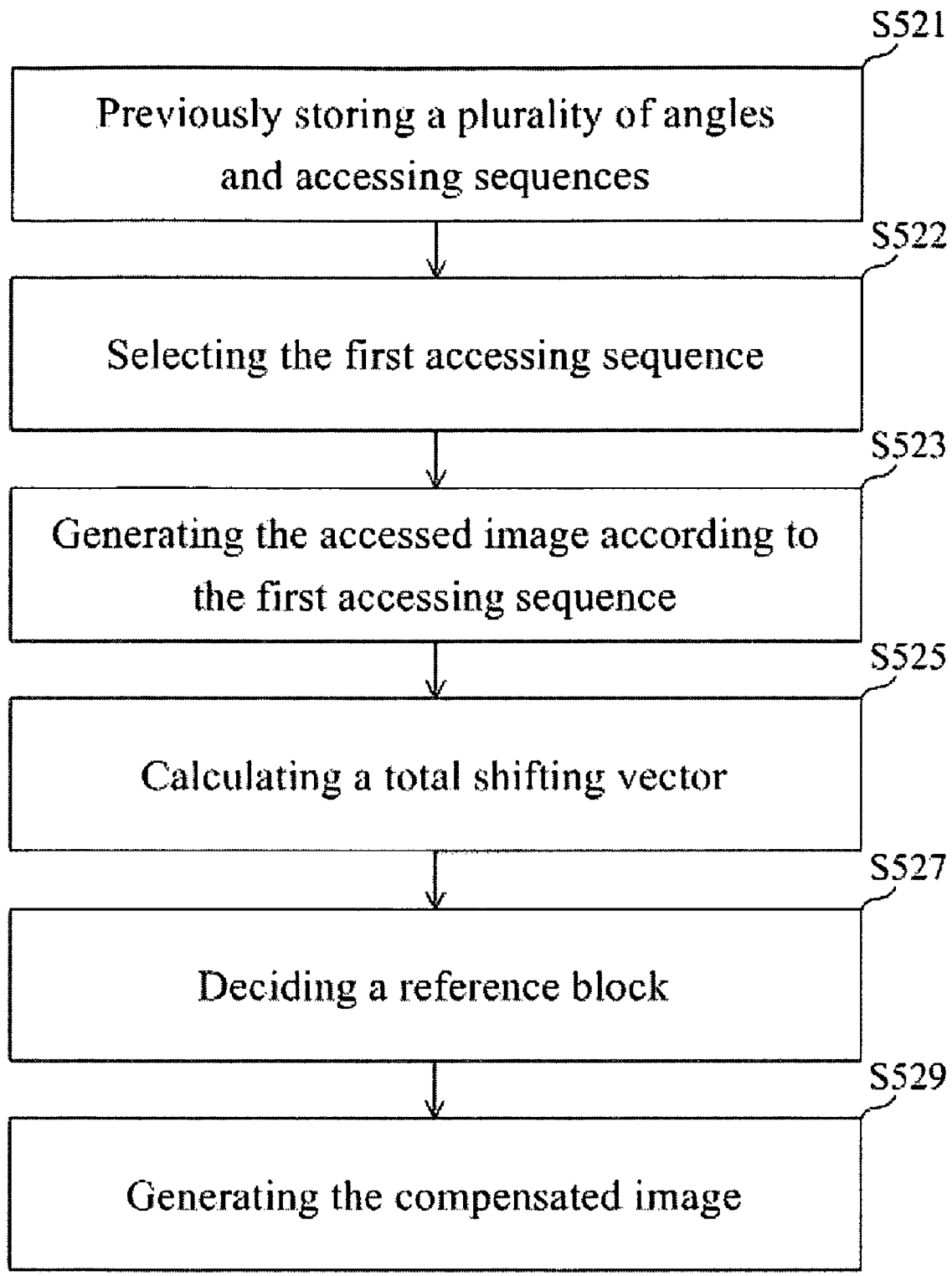
FIG. 7 illustrates the sub-steps that can be included in step S52 of FIG. 6.

Please refer to FIG. 7, which illustrates the sub-steps S521 through S529 that can be included in step S52 of FIG. 6. Step S521 is previously storing a plurality of angles and a plurality of accessing sequences corresponding to the plural angles. Step S522 is selecting the first accessing sequence corresponding to the second angle from the plurality of accessing sequences. Step S523 is accessing the sensed image to generate the accessed image according to the first accessing sequence. Step S525 is calculating a total shifting vector between the accessed image and the reference image based on the reference image. Step S527 is deciding a reference block in the reference image based on the total shifting vector. Step S529 is processing the accessed image to generate the compensated image based on the reference block.

Figure 8:
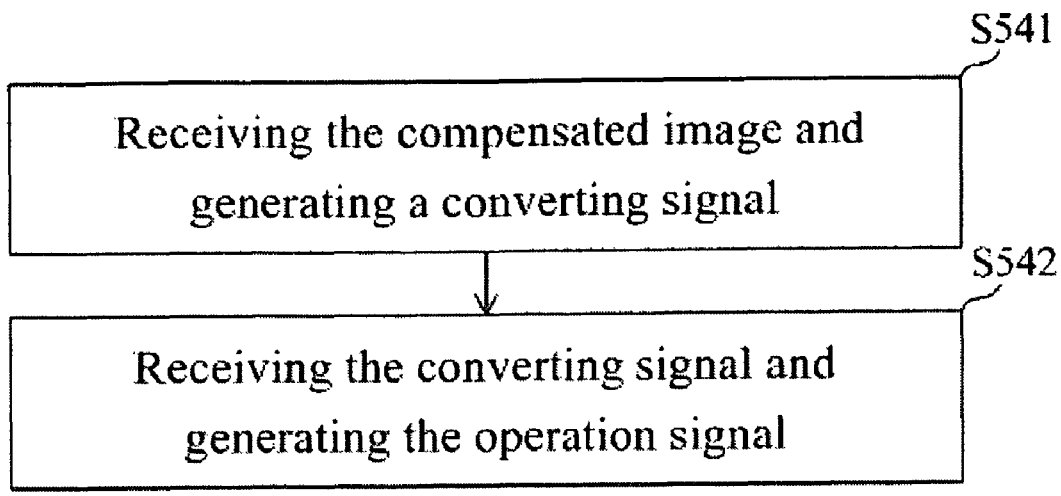
FIG. 8 illustrates the sub-steps that can be included in step S54 of FIG. 6.

Please refer to FIG. 8, which illustrates the sub-steps S541 and S542 that can be included in step S54 of FIG. 6. Step S541 is receiving the compensated image and performing a DCT calculation to generate a converting signal. Step S542 is receiving the converting signal and performing a quantization calculation to generate the operation signal.

Figure 9:
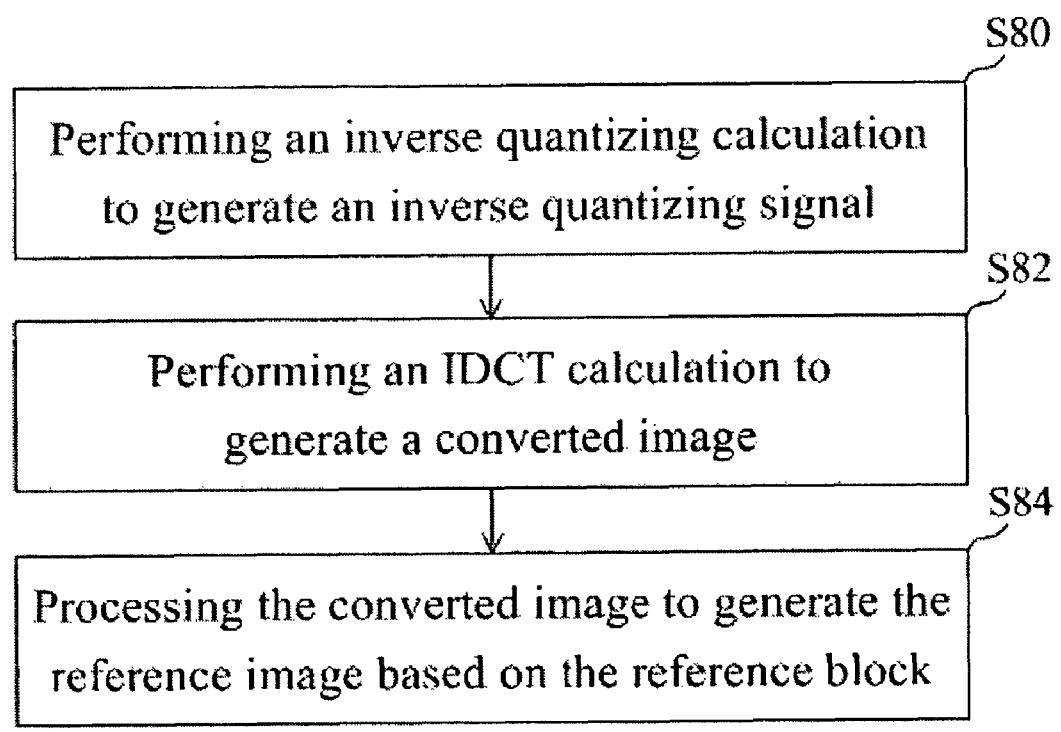
FIG. 9 illustrates the steps that can be further included in FIG. 6.

In actual applications, the adjusting method shown in FIG. 6 can further include the steps S80, S82, and S84 in FIG. 9. Step S80 is receiving the operation signal and performing an inverse quantizing calculation to generate an inverse quantizing signal. Step S82 is receiving the inverse quantizing signal and performing an IDCT calculation to generate a converted image. Step S84 is processing the converted image to generate the reference image based on the reference block. Besides, the adjusting method shown in FIG. 6 can also include a step of storing the reference image.

According to this invention, a plurality of angles and a plurality of accessing sequences corresponding to the plural angles are previously stored. Based on the second angle, a proper accessing sequence can be selected and used for accessing the sensed image. Thus, the sensed image can be adjusted from a first angle to the second angle. With the subsequent encoding module and output module, an adjusted output image can be provided.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adjusting apparatus for adjusting a sensed image from a first angle to a second angle, comprising:
    a first memory module for receiving and storing the sensed image;
    a first calculating module coupled to the first memory module, according to a predetermined rule, the first calculating module accessing the sensed image from the first memory module to generate an accessed image, based on the accessed image, the first calculating module further generating an operation signal;
    an encoding module coupled to the first calculating module, the encoding module receiving said operation signal from the first calculating module and encoding the operation signal to generate a bit-stream; and
    an output module coupled to the encoding module, the output module receiving the bit-stream from the encoding module and decoding said bit-stream to generate an output image;
    wherein said predetermined rule is a first accessing sequence corresponding to the second angle, which is selected from a plurality of accessing sequences corresponding to a plurality of angles, and the first calculating module accesses the sensed image from the first memory module based on the first accessing sequence corresponding to the second angle to adjust the sensed image from the first angle to the second angle.

2. The adjusting apparatus of claim 1, wherein the first calculating module comprises:
    an accessing unit for accessing the sensed image to generate the accessed image according to the first accessing sequence;
    a discrete cosine transferring (DCT) unit coupled to the accessing unit, the DCT unit receiving the accessed image and performing a DCT calculation to generate a converting signal; and
    a quantizing unit coupled to the DCT unit, the quantizing unit receiving the converting signal and performing a quantization calculation to generate the operation signal.

3. The adjusting apparatus of claim 1, the adjusting apparatus further comprising:
    a selecting module coupled to the first calculating module, wherein the plurality of angles and the plurality of accessing sequences corresponding to the plurality of angles are previously stored in the selecting module, from the plurality of accessing sequences, the selecting module selects the first accessing sequence corresponding to the second angle.

4. The adjusting apparatus of claim 3, the adjusting apparatus further comprising:
   an input module coupled to the selecting module, the input module being used for inputting the second angle.

5. The adjusting apparatus of claim 3, the adjusting apparatus further comprising:
   a detecting module coupled to the selecting module, the detecting module being used for detecting the second angle and providing the second angle to the selecting module.

6. An adjusting method for adjusting a sensed image from a first angle to a second angle, comprising the steps of:
   (a) receiving and storing the sensed image;
   (b) selecting a first accessing sequence corresponding to the second angle to be a predetermined rule from a plurality of accessing sequences corresponding to a plurality of angles;
   (c) according to the predetermined rule, accessing the sensed image to adjust the sensed image from the first angle to the second angle and generate an accessed image, and generating an operation signal based on the accessed image;
   (d) encoding the operation signal to generate a bit-stream; and
   (e) receiving the bit-stream and decoding said bit-stream to generate an output image
   wherein said predetermined rule is a first accessing sequence corresponding to the second angle.

7. The adjusting method of claim 6, wherein the step (b) comprises the sub-steps of:
   (b1) previously storing the plurality of angles and the plurality of accessing sequences corresponding to the plurality of angles; and
   (b2) selecting the first accessing sequence corresponding to the second angle from the plurality of accessing sequences previously stored.

8. The adjusting method of claim 6, wherein the step (c) comprises the sub-steps of:
   (c1) according to the first accessing sequence, accessing the sensed image to generate the accessed image;
   (c2) receiving the accessed image and performing a DCT calculation to generate a converting signal; and
   (c3) receiving the converting signal and performing a quantization calculation to generate the operation signal.

* * * * *